US012223439B2

(12) United States Patent
Yuan et al.

(10) Patent No.: US 12,223,439 B2
(45) Date of Patent: Feb. 11, 2025

(54) VISUAL-SEMANTIC REPRESENTATION LEARNING VIA MULTI-MODAL CONTRASTIVE TRAINING

(71) Applicant: ADOBE INC., San Jose, CA (US)

(72) Inventors: Xin Yuan, Chicago, IL (US); Zhe Lin, Bellevue, WA (US); Jason Wen Yong Kuen, Santa Clara, CA (US); Jianming Zhang, Campbell, CA (US); Yilin Wang, Sunnyvale, CA (US); Ajinkya Kale, San Jose, CA (US); Baldo Faieta, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 1016 days.

(21) Appl. No.: 17/190,668

(22) Filed: Mar. 3, 2021

(65) Prior Publication Data
US 2022/0284321 A1    Sep. 8, 2022

(51) Int. Cl.
*G06N 5/04* (2023.01)
*G06N 3/08* (2023.01)
*G06N 20/00* (2019.01)

(52) U.S. Cl.
CPC .............. *G06N 5/04* (2013.01); *G06N 3/08* (2013.01); *G06N 20/00* (2019.01); *G06T 2207/00* (2013.01)

(58) Field of Classification Search
None
See application file for complete search history.

(56) References Cited

U.S. PATENT DOCUMENTS

| 11,562,039 | B2 * | 1/2023 | Renders | G06F 16/75 |
| 2013/0080426 | A1 * | 3/2013 | Chen | G06F 16/5866 707/723 |
| 2016/0321522 | A1 * | 11/2016 | Yuan | G06F 18/214 |
| 2017/0330068 | A1 * | 11/2017 | Yu | G06F 18/253 |
| 2018/0108124 | A1 * | 4/2018 | Guo | G06V 30/18057 |
| 2020/0302340 | A1 * | 9/2020 | Durand | G06N 3/045 |
| 2022/0245179 | A1 * | 8/2022 | Dernoncourt | G06F 16/338 |
| 2023/0260164 | A1 * | 8/2023 | Yuan | G06N 20/00 382/157 |
| 2024/0070440 | A1 * | 2/2024 | Hoehne | G06N 3/08 |

FOREIGN PATENT DOCUMENTS

| CN | 106485270 A | * | 3/2017 | G06K 9/6276 |
| CN | 106777402 A | * | 5/2017 | G06F 16/33 |

OTHER PUBLICATIONS

Translation CN-106777402-A (Year: 2024).*
Translation CN-106485270-A (Year: 2024).*
(Continued)

*Primary Examiner* — J. Todd Newton
(74) *Attorney, Agent, or Firm* — F. CHAU & ASSOCIATES, LLC

(57) ABSTRACT

Systems and methods for multi-modal representation learning are described. One or more embodiments provide a visual representation learning system trained using machine learning techniques. For example, some embodiments of the visual representation learning system are trained using cross-modal training tasks including a combination of intra-modal and inter-modal similarity preservation objectives. In some examples, the training tasks are based on contrastive learning techniques.

20 Claims, 12 Drawing Sheets

(56) References Cited

OTHER PUBLICATIONS

Udandarao et al., COBRA: Contrastive Bi-Modal Representation Algorithm, 2020, arXiv:2005.03687 [cs.LG] https://doi.org/10.48550/arXiv.2005.03687, Entire document (Year: 2020).*
1Alayrac, et al., "Self-Supervised MultiModal Versatile Networks", CoRR, abs/2006.16228, 2020, 19 pages.
2Bachman, et al., "Learning Representations by Maximizing Mutual Information Across Views", In Hanna M. Wallach, Hugo Larochelle, Alina Beygelzimer, Florence d'Alche-Buc, Emily B. Fox, and Roman Garnett, editors, NeurIPS, arXiv:1906.00910v2 [cs.LG] Jul. 8, 2019, pp. 15509-15519, 2019.
3Caron, et al., "Unsupervised Pre-Training of Image Features on Non-Curated Data", In ICCV, pp. 2959-2968. IEEE, 2019.
4Chen, et al., "A Simple Framework for Contrastive Learning of Visual Representations", CoRR, abs/2002.05709, 2020, 11 pages.
5Chen, et al., "Improved Baselines with Momentum Contrastive Learning", CoRR, abs/2003.04297, 2020, arXiv:2003.04297v1 [cs.CV] Mar. 9, 2020, 3 pages.
6Church, et al., Word Association Norms, Mutual Information, and Lexicography, Comput. Linguistics, 16(1):22-29, 1990.
7Deng, et al., "ImageNet: A Large-Scale Hierarchical Image Database", In CVPR, pp. 248-255. IEEE Computer Society, 2009.
8Desai, et al., "VirTex: Learning Visual Representations from Textual Annotations", CoRR, abs/2006.06666, arXiv:2006.06666v1 [cs.CV] Jun. 11, 2020, 27 pages.
9Devlin, et al., "BERT: Pre-Training of Deep Bidirectional Transformers for Language Understanding", In Jill Burstein, Christy Doran, and Thamar Solorio, editors, NAACL-HLT, pp. 4171-4186, Association for Computational Linguistics, arXiv:1810.04805v2 [cs.CL] May 24, 2019.
10Doersch, et al., "Unsupervised Visual Representation Learning by Context Prediction", In ICCV, pp. 1422-1430, IEEE Computer Society, 2015.
11Edunov, et al., "Understanding Back-Translation at Scale", In Ellen Riloff, David Chiang, Julia Hockenmaier, and Jun'ichi Tsujii, editors, EMNLP, pp. 489-500, Association for Computational Linguistics, arXiv:1808.09381v2 [cs.CL] Oct. 3, 2018.
12Everingham, et al., "The Pascal Visual Object Classes Challenge: A Retrospective", Int. J. Comput. Vis., 111(1):98-136, 2015.
13Faghri, et al., "VSE++: Improving Visual-Semantic Embeddings with Hard Negatives", In BMVC, p. 12. BMVA Press, arXiv:1707.05612v4 [sc.LG] Jul. 29, 2018.
14Gattupalli, et al., "Weakly Supervised Deep Image Hashing through Tag Embeddings", In CVPR, pp. 10375-10384, Computer Vision Foundation /IEEE, 2019.
15Girshick, et al., "Rich feature hierarchies for accurate object detection and semantic segmentation", In CVPR, pp. 580-587. IEEE Computer Society, 2014.
16Gomez, et al., "Self-supervised learning of visual features through embedding images into text topic spaces", In CVPR, pp. 2017-2026, IEEE Computer Society, 2017.
17Gordo, et al., "Beyond instance-level image retrieval: Leveraging captions to learn a global visual representation for semantic retrieval", In CVPR, pp. 6589-6598, IEEE Computer Society, 2017.
18Gu, et al., "Look, Imagine and Match: Improving Textual-Visual Cross-Modal Retrieval with Generative Models", In CVPR, pp. 7181-7189, IEEE Computer Society, 2018.
19Gu, et al., "An Empirical Study of Language CNN for Image Captioning", In ICCV, pp. 1222-1231, IEEE Computer Society, 2017.
20Guo, et al., "Visual Attention Consistency under Image Transforms for Multi-Label Image Classification", In CVPR, pp. 729-739, Computer Vision Foundation / IEEE, 2019.
21Gutmann, et al., "Noise-contrastive estimation: A new estimation principle for unnormalized statistical models", In Yee Whye Teh and D. Mike Titterington, editors, AIStats, vol. 9 of JMLR Proceedings, pp. 297-304, JMLR.org, 2010.
22He, et al., "Momentum Contrast for Unsupervised Visual Representation Learning", In CVPR, pp. 9729-9738, IEEE, 2020.
23He, et al., "Mask R-CNN", In ICCV, pp. 2961-2969, IEEE Computer Society, 2017.
24He, et al., "Deep Residual Learning for Image Recognition", In CVPR, pp. 770-778, IEEE Computer Society, 2016.
25Henaff, et al., "Data-Efficient Image Recognition with Contrastive Predictive Coding", CoRR, abs/1905.09272, 11 pages, 2019.
26Hjelm, et al., "Learning Deep Representations by Mutual Information Estimation and Maximization", In ICLR, OpenReview.net, arXiv:1808.06670v5 [stat.ML] Feb. 22, 2019, 24 pages.
27Huang, et al., "Densely Connected Convolutional Networks", In CVPR, pp. 4700-4708, IEEE Computer Society, 2017.
[28] Andrej Karpathy and Fei-Fei Li. Deep visual-semantic alignments for generating image descriptions. In CVPR, pp. 3128-3137, IEEE Computer Society, 2015.
29Khosla, et al., "Supervised Contrastive Learning", CoRR, abs/2004.11362, arXiv:2004.11362v4 [cs.LG] Dec. 10, 2020, 23 pages.
30Kingma, et al., ADAM: A Method for Stochastic Optimization, In Yoshua Bengio and Yann LeCun, editors, ICLR, arXiv:1412.6980v9 [cs.LG] Jan. 30, 2017, 15 pages, 2015.
31Kiros, et al., "Unifying Visual-Semantic Embeddings with Multimodal Neural Language Models", CoRR, abs/1411.2539, arXiv:1411.2539v1 [cs.LG] Nov. 10, 2014, 13 pages.
32Li, et al., "Learning Visual N-Grams from Web Data", In ICCV, pp. 4183-4192, IEEE Computer Society, 2017.
33Li, et al., "Oscar: Object-Semantics Aligned Pre-training for Vision-Language Tasks", In Andrea Vedaldi, Horst Bischof, Thomas Brox, and Jan-Michael Frahm, editors, ECCV, vol. 12375 of Lecture Notes in Computer Science, pp. 121-137, Springer, arXiv:2004.06165v5 [cs.CV] Jul. 26, 2020.
34Lin, et al., "Feature Pyramid Networks for Object Detection", In CVPR, pp. 2117-2125, IEEE Computer Society, 2017.
35Lin, et al., "Microsoft COCO: Common Objects in Context", In David J. Fleet, Tomas Pajdla, Bernt Schiele, and Tinne Tuytelaars, editors, ECCV, vol. 8693 of Lecture Notes in Computer Science, pp. 740-755. Springer, 2014.
36Liu, et al., "SSD: Single Shot MultiBox Detector", In Bastian Leibe, Jiri Matas, Nicu Sebe, and Max Welling, editors, ECCV, vol. 9905 of Lecture Notes in Computer Science, pp. 21-37, Springer, arXiv:1512.02325v5 [cs.CV] Dec. 29, 2016.
37Long, et al., "Fully Convolutional Networks for Semantic Segmentation", In CVPR, pp. 3431-3440, IEEE Computer Society, 2015.
38Miech, et al., "End-to-End Learning of Visual Representations from Uncurated Instructional Videos", In CVPR, pp. 9879-9889, IEEE, 2020.
39Ott, et al., Scaling Neural Machine Translation, In Ondrej Bojar, Rajen Chatterjee, Christian Federmann, Mark Fishel, Yvette Graham, Barry Haddow, Matthias Huck, Antonio Jimeno-Yepes, Philipp Koehn, Christof Monz, Matteo Negri, Aurelie Nev ' eol, Mariana L. Neves, Matt Post, Lucia Specia, Marco Turchi, and Karin Verspoor, editors, WMT, pp. 1-9, Association for Computational Linguistics, 2018.
40Peng, et al., "MegDet: A Large Mini-Batch Object Detector", In CVPR, pp. 6181-6189, IEEE Computer Society, 2018.
41Quattoni, et al., "Learning Visual Representations using Images with Captions", In CVPR, IEEE Computer Society, 2007, 8 pages.
42Redmon, et al., "You Only Look Once: Unified, Real-Time Object Detection", In CVPR, pp. 779-788, IEEE Computer Society, 2016.
43Ren, et al., "Faster R-CNN: Towards Real-Time Object Detection with Region Proposal Networks", In Corinna Cortes, Neil D. Lawrence, Daniel D. Lee, Masashi Sugiyama, and Roman Garnett, editors, NIPS, pp. 91-99, 2015, arXiv:1506.01497v3 [cs.CV] Jan. 6, 2016.
44Sariyildiz, et al., "Learning Visual Representations with Caption Annotations", In Andrea Vedaldi, Horst Bischof, Thomas Brox, and Jan-Michael Frahm, editors, ECCV, vol. 12353 of Lecture Notes in Computer Science, pp. 153-170, Springer, arXiv:2008.01392v1 [cs.CV] Aug. 4, 2020.
45Simonyan et al., "Very Deep Convolutional Networks for Large-Scale Image Recognition", In Yoshua Bengio and Yann LeCun, editors, ICLR, 2015, 14 pages.

(56) References Cited

OTHER PUBLICATIONS

46Su, et al., "VL-BERT: Pre-Training of Generic VisualLinguistic Representations", In ICLR, OpenReview.net, 2020, 16 pages.
47Tian, et al., "Contrastive Multiview Coding", CoRR, abs/1906. 05849, 2019, 16 pages, arXiv:1906.05849v5 [cs.CV] Dec. 18, 2020.
48Oord, et al., "Representation Learning with Contrastive Predictive Coding", CoRR, abs/1807.03748, 2018, 13 pages, arXiv:1807. 03748v2 [cs.LG] Jan. 22, 2019.
49Vaswani, et al., "Attention Is All You Need", In Isabelle Guyon, Ulrike von Luxburg, Samy Bengio, Hanna M. Wallach, Rob Fergus, S. V. N. Vishwanathan, and Roman Garnett, editors, NIPS, pp. 5998-6008, arXiv:1706.03762v5 [cs.CL] Dec. 6, 2017.
50Wang, et al., "Learning Deep Structure-Preserving Image-Text Embeddings", In CVPR, pp. 5005-5013, IEEE Computer Society, 2016.
51Wu, et al., "Unsupervised Feature Learning via Non-Parametric Instance Discrimination", In CVPR, pp. 3733-3742, IEEE Computer Society, 2018.
52Zhang, et al., "Salient Object Subitizing", Int. J. Comput. Vis., 124(2):169-186, 2017.
53Zhang, et al., "Colorful Image Colorization", In Bastian Leibe, Jiri Matas, Nicu Sebe, and Max Welling, editors, ECCV, vol. 9907 of Lecture Notes in Computer Science, pp. 649-666, Springer, arXiv:1603.08511v5 [cs.CV] Oct. 5, 2016.
54Zhuang, et al., "Local Aggregation for Unsupervised Learning of Visual Embeddings", In ICCV, pp. 6002-6012, IEEE, 2019.

\* cited by examiner

VISUAL-SEMANTIC REPRESENTATION LEARNING VIA MULTI-MODAL CONTRASTIVE TRAINING

BACKGROUND

The following relates generally to multi-modal representation learning, and more specifically to representation learning that combines visual representation learning and text representation learning.

Representation learning is a category of machine learning that refers to representing complex data in an embedding space. For example, the features of an image (including semantic features) can be represented in a vector space. Similarly, natural language text can be represented in a vector space.

However, conventional representation learning models are not trained to represent different modalities (e.g., text and images) in the same embedding space. As a result, these networks do not incorporate cross-modal semantic information, and cannot be used to compare or differentiate cross-modal inputs. Therefore, there is a need in the art for improved systems and methods of multi-modal representation learning.

SUMMARY

The present disclosure describes systems and methods for multi-modal representation learning. One or more embodiments provide a visual representation learning system trained using machine learning techniques. For example, some embodiments of the visual representation learning system are trained using cross-modal training tasks including a combination of intra-modal and inter-modal similarity preservation objectives. In some examples, the training tasks are based on contrastive learning techniques.

A method, apparatus, non-transitory computer readable medium, and system for visual representation learning are described. One or more embodiments of the method, apparatus, non-transitory computer readable medium, and system include identifying a training set comprising a plurality of images and a plurality of captions corresponding to the images, encoding the images using an image encoder to produce encoded images, encoding the captions using a text encoder to produce encoded text, computing a multi-modal loss function based on the encoded images and the encoded text, the multi-modal loss function comprising at least one image loss term, at least one text loss term, and at least one cross-modal term, and training the image encoder and the text encoder based on the multi-modal loss function.

An apparatus, system, and method for visual representation learning are described. One or more embodiments of the apparatus, system, and method include an image encoder configured to encode images to produce encoded images, a text encoder configured to encode captions corresponding to the images to produce encoded text, and a training component configured to compute a multi-modal loss function based on the encoded images and the encoded text and to train the image encoder and the text encoder based on the multi-modal loss function, wherein the multi-modal loss function comprises at least one image loss term, at least one text loss term, and at least one cross-modal term.

A method, apparatus, non-transitory computer readable medium, and system for visual representation learning are described. One or more embodiments of the method, apparatus, non-transitory computer readable medium, and system include encoding an image using an image encoder to produce an encoded image, encoding text using a text encoder to produce encoded text, wherein the image encoder and the text encoder are jointly trained based on a multi-modal loss function comprising at least one image loss term, at least one text loss term, and at least one cross-modal term, and performing an image search based on the encoded image and the encoded text.

DETAILED DESCRIPTION

Figure 1:
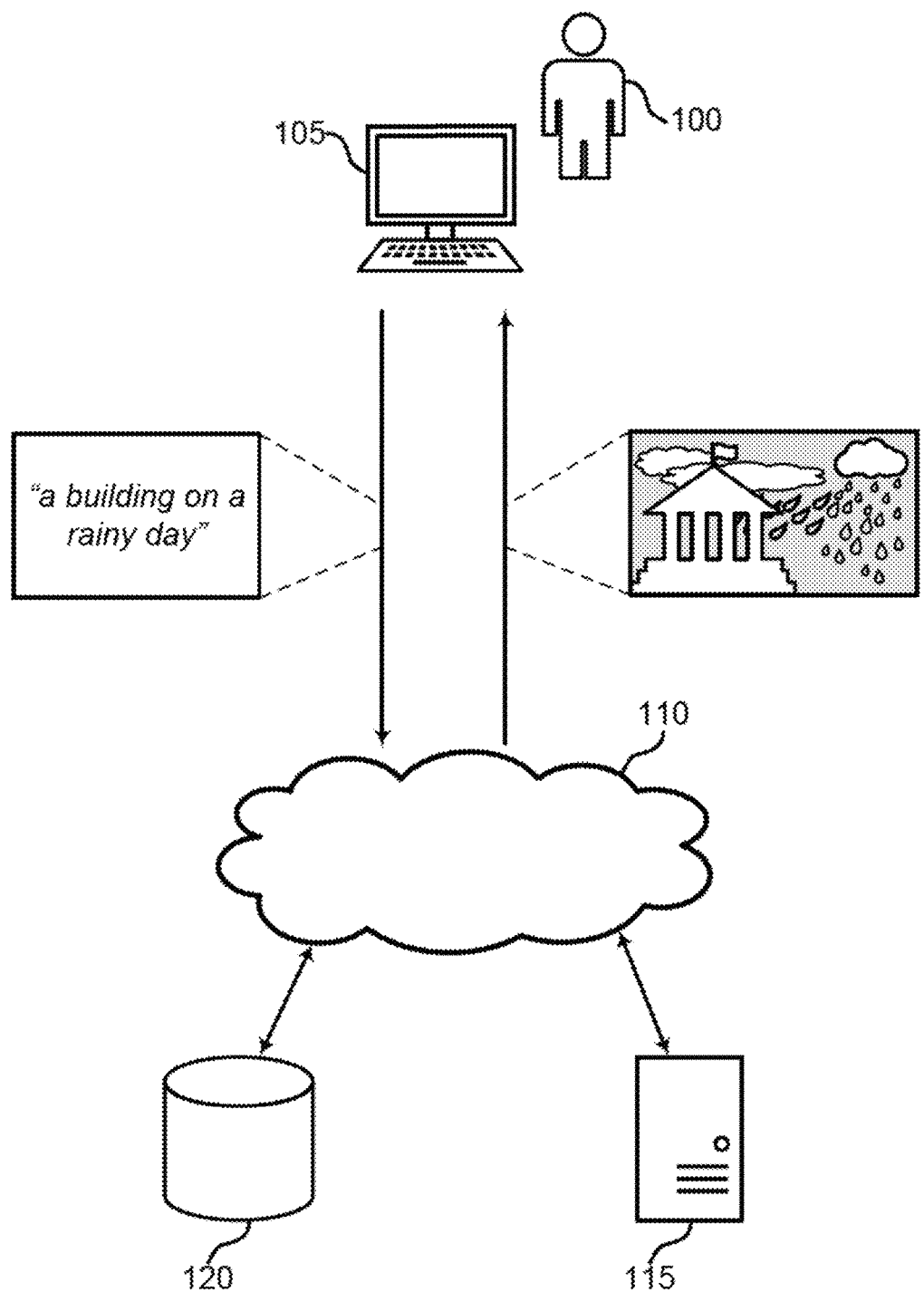
FIG. 1 shows an example of an image search system according to aspects of the present disclosure.

The present disclosure describes systems and methods for multi-modal representation learning. One or more embodiments provide a representation learning system trained using multi-modal training tasks. For example, the training tasks may include a combination of intra-modal and inter-modal similarity preservation objectives. In some examples, the training tasks are based on contrastive learning techniques. The visual representation learning system may used in a variety of applications including image search applications.

Visual representation is vital in learning many computer vision tasks including image classification, tagging, object detection, semantic and instance segmentation. However, conventional visual representation systems are unable to incorporate information across multiple modalities. Thus, even if descriptive text is available for an image, conventional visual representation systems are do not take advantage of the additional semantic information available from the description. As a result, these systems are less accurate, and do not perform well on multi-modal tasks such as image search based on a text query (or vice versa).

One or more embodiments of the present disclosure use intrinsic data properties within multiple modalities, as well as semantic information from cross-modal correlations to enhance the quality of learned visual representations. By including multi-modal training in a unified framework with different types of contrastive losses, the present disclosure learns powerful and generic visual features. Some embodiments include both an image encoder and a text encoder that are trained simultaneously using a multi-modal loss function. Some embodiments use a combination of single-mode self-supervised learning and cross-modal learning. Contrastive learning techniques may be used for both single mode and cross-modal training tasks.

By applying the unconventional combination of self-supervised learning, contrastive learning, and multi-modal training tasks, embodiments of the present disclosure capture semantic information from multiple modalities (e.g., image and text modalities), as well as cross-modal semantic correlations. As a result, embodiments of the present disclosure achieve improved accuracy in a variety of tasks including computer vision tasks and multi-modal search tasks.

Embodiments of the present disclosure may be used in the context of an image or text search. For example, a multi-modal representation apparatus of the present disclosure may receive natural language or an image as a query and efficiently search through millions of images to find relevant images or text. An example of an application of the inventive concept in a cross-modal image search context is provided with reference to FIGS. 1 through 3. Details regarding an example architecture are provided with reference to FIGS. 4 through 6. Information regarding an example training process are provided with references to FIGS. 7 through 12.

Cross-Modal Image Search

FIG. 1 shows an example of an image search system according to aspects of the present disclosure. The example shown includes user 100, device 105, cloud 110, multi-modal representation apparatus 115, and database 120.

According to some embodiments, the user 100 communicates with the multi-modal representation apparatus 115 via the device 105 and the cloud 110. For example, the user 100 may provide a query such as a text query or an image query. In the example illustrated in FIG. 1, the query object includes text referencing a building and a background (i.e., "a building on a rainy day"). The device 105 transmits the search query to the multi-modal representation apparatus 115 to find related objects or information. In some examples, the device 105 communicates with the multi-modal representation apparatus 115 via the cloud 110. The multi-modal representation apparatus 115 encodes the search query, and compares the encoded query to encoded images (i.e., search objects stored within the database 120). Then, the multi-modal representation apparatus 115 (or a search engine that uses the multi-modal representation apparatus 115) returns relevant results to the user 100 based on the comparison.

The device 105 may be a personal computer, laptop computer, mainframe computer, palmtop computer, personal assistant, mobile device, or any other suitable processing apparatus. In some examples, the device 105 includes software (e.g., an internet browser that includes or accesses a search engine) capable of performing cross-modal search.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud 110 networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network including multiple edge routers and core routers. In another example, a cloud 110 is based on a local collection of switches in a single physical location.

The multi-modal representation apparatus 115 receives input information (i.e., text or an image), encodes the information to represent features of the input, and uses the feature information to enable a cross-modal search operation. In some cases, visual and textual features are embedded into a common embedding space so that, for example, embedded images that. In some examples, the multi-modal representation apparatus 115 considers higher-level abstract concepts that offer the potential for drawing useful connections across different modalities.

In some cases, the multi-modal representation apparatus 115 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some examples, the multi-modal representation apparatus 115 includes (or is included within) an information retrieval system or a search system that performs image or document search based on content understanding of a query object. The multi-modal representation apparatus 115 can be used to identify objects, subjects, action, tone, emotion, concepts, aesthetics, style, and media types such as images, videos, documents, composites, etc.

In some embodiments, the multi-modal representation apparatus 115 includes an artificial neural network (ANN) to generate visual and textual features of the original information. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge are associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Figure 4:
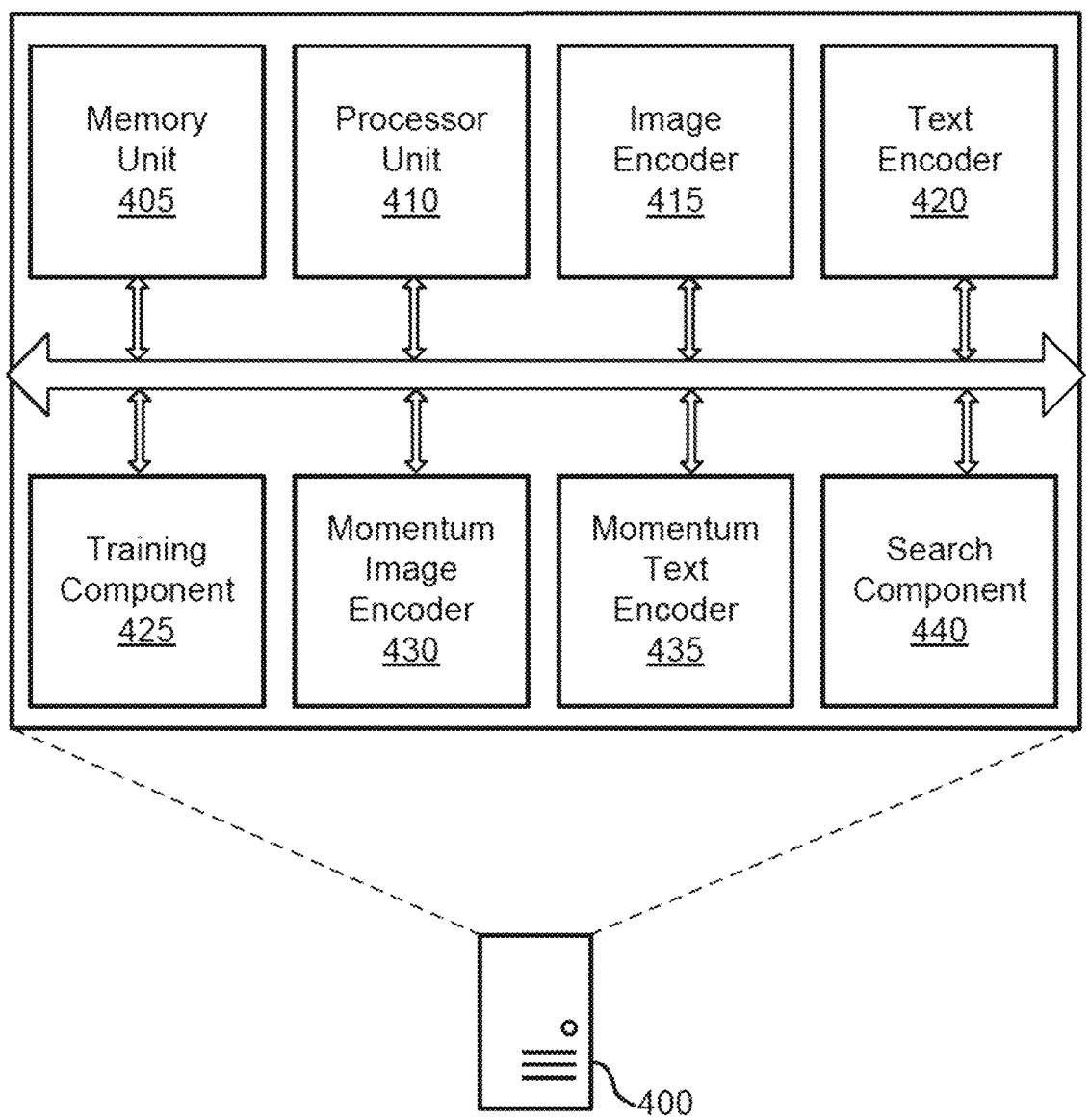
FIG. 4 shows an example of a multi-modal representation apparatus according to aspects of the present disclosure.
Figure 5:
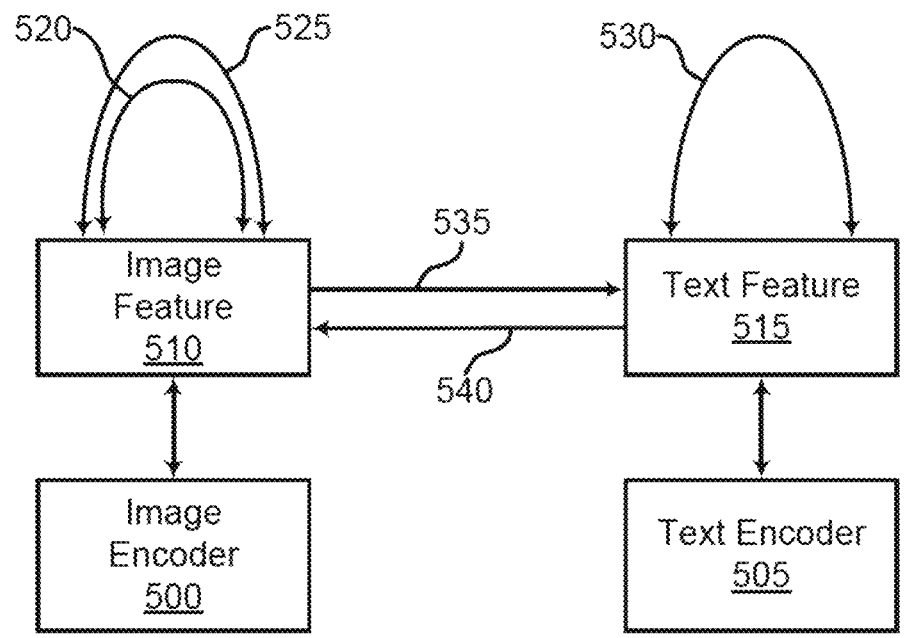
FIG. 5 shows an example of a process for visual representation learning according to aspects of the present disclosure.
Figure 6:
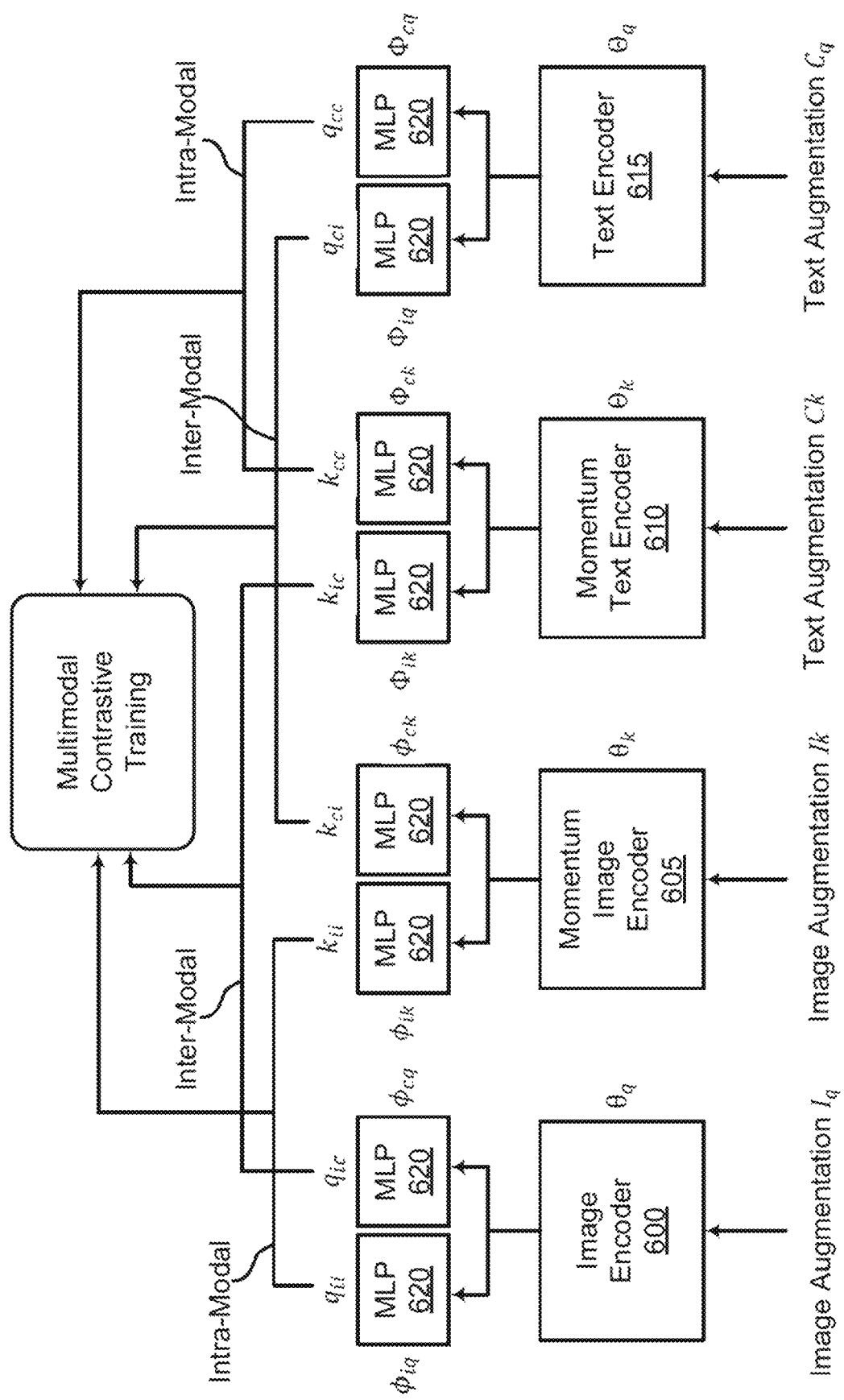
FIG. 6 shows an example of a process for multi-modal contrastive training according to aspects of the present disclosure.

Further detail regarding the architecture of the multi-modal representation apparatus 115 is provided with reference to FIGS. 4 through 6. Further detail regarding the training of multi-modal representation apparatus 115 is provided with reference to FIGS. 7 through 12.

A database 120 is an organized collection of data. For example, database 120 may store images along with encoding information that enables the images to be associated with text queries. Database 120 may store data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

Figure 2:
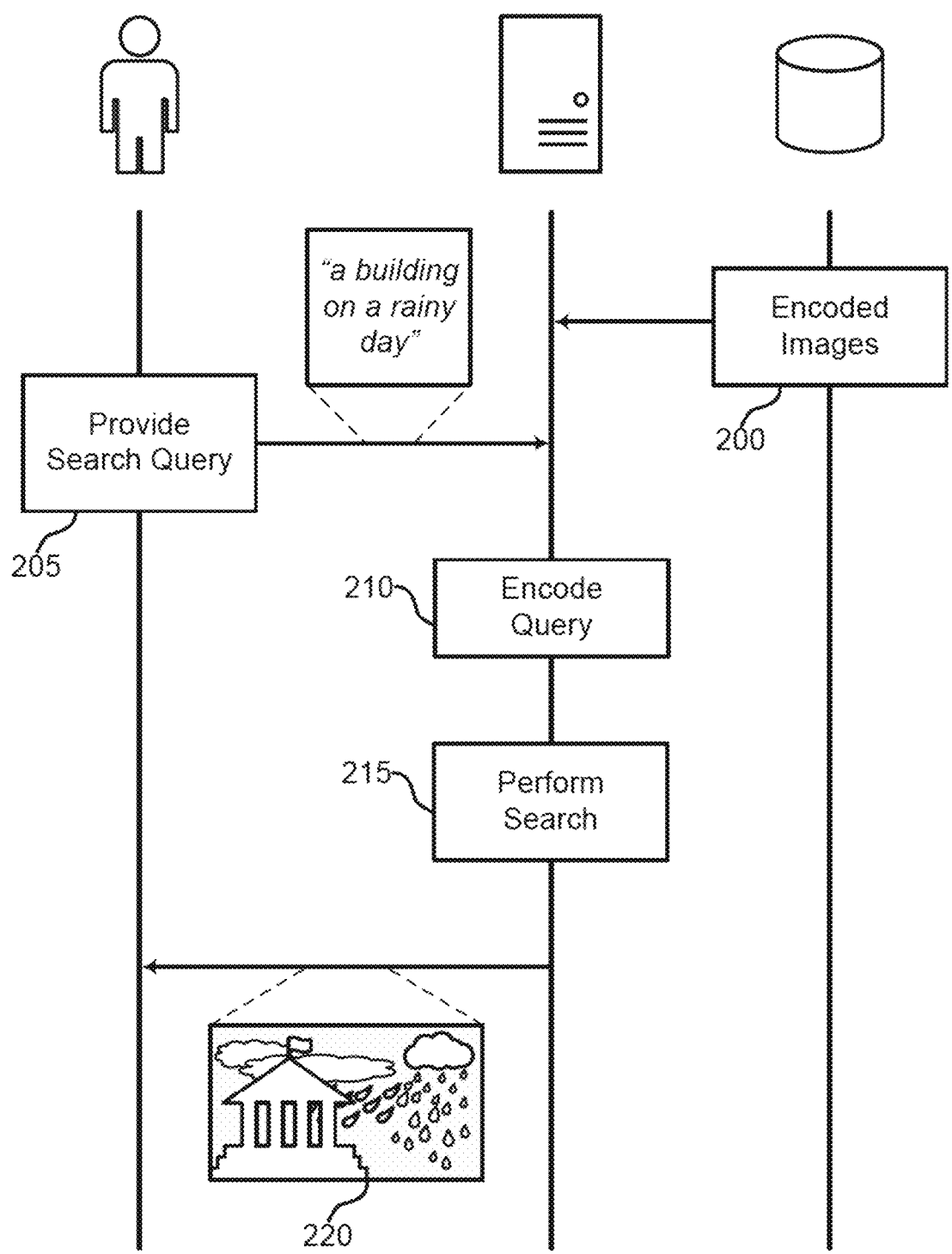
FIG. 2 shows an example of a search process according to aspects of the present disclosure.

FIG. 2 shows an example of a search process according to aspects of the present disclosure. According to the example of FIG. 2, a text query and images are embedded into a common embedding space for use by an image search engine. The image search application described in FIG. 2 is one embodiment of the present disclosure is not limited to this example. For example, pre-trained image representations can be transferred to many downstream computer vision tasks to achieve excellent performance under common transfer learning protocols.

At step 200, images stored on a database (e.g., database 120) are encoded (e.g., using a multi-modal representation apparatus 115). The images and the encodings may both be stored together on the database.

At step 205, a user provides a search query into an image search engine. For example, the user may provide a query such as "a building on a rainy day".

At step 210, the text query is encoded into a common embedding space (i.e., the same embedding space as the images stored on the database). For example, the text query may be encoded with a text encoder that is part of a multi-modal representation network that also includes an image encoder. The text encoder and the image encoder may be jointly trained using multi-modal contrastive learning techniques.

At step 215, the encoded query may be compared to the encoded images. For example, a similarity score may be computed that represents the similarity of the encoded query to each of a plurality of stored images. Images that have a similar semantic meaning (i.e., similar encoded representations) may be selected and returned to the user.

Images are encoded by the database, and the user provides a search query. For example, the search query can be an image or text. Tags (words to describe the image or text) may be associated with the image or text. For example, in response to the search query "a building on a rainy day" the system may return one or more images depicting a building on a rainy day.

Figure 3:
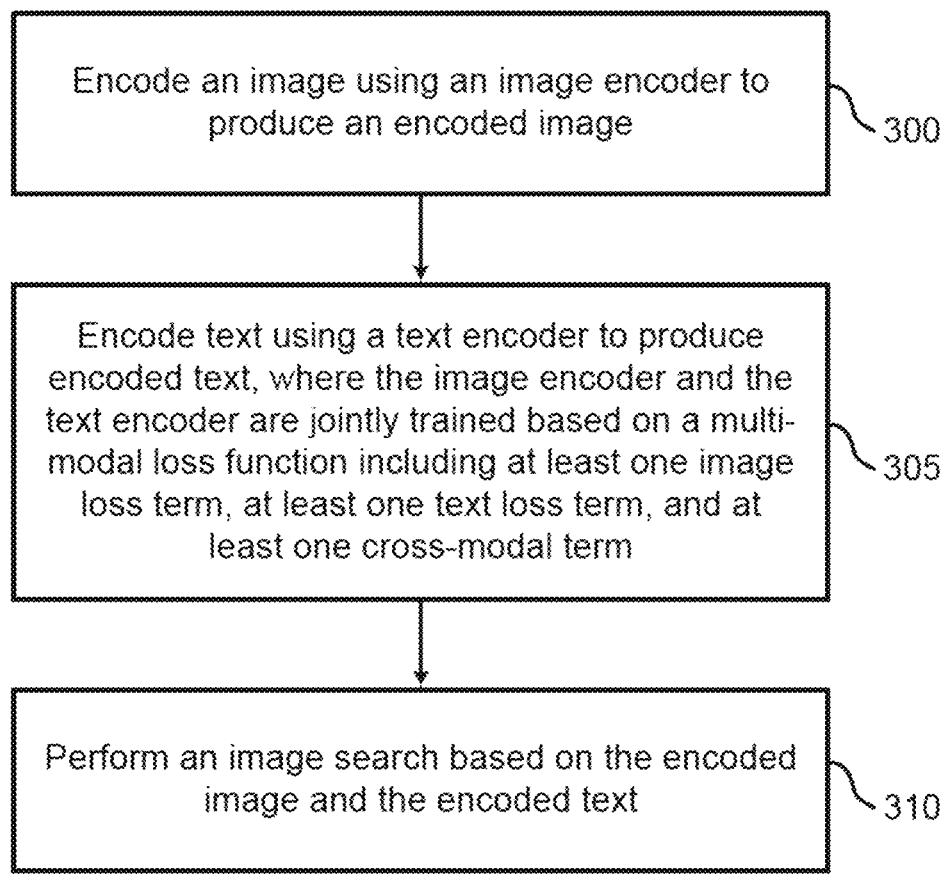
FIG. 3 shows an example of a process for visual representation learning according to aspects of the present disclosure.

FIG. 3 shows an example of a process for visual representation learning according to aspects of the present disclosure. In some examples, these operations are performed by a system (e.g., the system depicted in FIG. 1) including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method, apparatus, non-transitory computer readable medium, and system for visual representation learning are described. One or more embodiments of the method, apparatus, non-transitory computer readable medium, and system include encoding an image using an image encoder to produce an encoded image, encoding text using a text encoder to produce encoded text, wherein the image encoder and the text encoder are jointly trained based on a multi-modal loss function including at least one image loss term, at least one text loss term, and at least one cross-modal term, and performing an image search based on the encoded image and the encoded text.

At operation 300, the system encodes an image using an image encoder to produce an encoded image. In some cases, the operations of this step refer to, or may be performed by, an image encoder as described with reference to FIGS. 4-6. The term "encode" refers computing an alternate representation of the image (e.g., in a high dimensional vector space).

At operation 305, the system encodes text using a text encoder to produce encoded text, where the image encoder and the text encoder are jointly trained based on a multi-modal loss function including at least one image loss term, at least one text loss term, and at least one cross-modal term. For example, the multi-modal loss function may be based on contrastive learning techniques. In some cases, the operations of this step refer to, or may be performed by, a text encoder as described with reference to FIGS. 4-6. Further detail regarding the training of the image encoder and the text encoder are provided with reference to FIGS. 7-12.

At operation 310, the system performs an image search based on the encoded image and the encoded text. In some cases, the operations of this step refer to, or may be performed by, a search component as described with reference to FIG. 4.

In some examples, an image search may be performed, where the image search includes retrieving search text corresponding to a query image, retrieving a search image corresponding to a query text, or retrieving the search image corresponding to the query image.

Network Architecture

In FIGS. 4-6, an apparatus, system, and method for visual representation learning are described. One or more embodiments of the apparatus, system, and method include an image encoder configured to encode images to produce encoded images, a text encoder configured to encode captions corresponding to the images to produce encoded text, and a training component configured to compute a multi-modal loss function based on the encoded images and the encoded text and to train the image encoder and the text encoder based on the multi-modal loss function, wherein the multi-modal loss function includes at least one image loss term, at least one text loss term, and at least one cross-modal term.

Some examples of the apparatus, system, and method described above further include a momentum image encoder configured to encode the images to produce momentum encoded images, wherein the at least one image loss term is based on the encoded images and the momentum encoded images. Some examples of the apparatus, system, and method described above further include a momentum text encoder configured to encode the captions to produce momentum encoded text, wherein the at least one text loss term is based on the encode text and the momentum encoded text.

In some examples, the image encoder includes a first image output head and a second image output head, wherein the at least one image loss term is based on the first image output head and the at least one cross-modal term is based on the second image output head. In some examples, the text encoder includes a first text output head and a second text output head, wherein the at least one text loss term is based on the first text output head and the at least one cross-modal term is based on the second text output head.

FIG. 4 shows an example of a multi-modal representation apparatus 400 according to aspects of the present disclosure. Multi-modal representation apparatus 400 is an example of, or includes aspects of, the corresponding element described with reference to FIG. 1. In one embodiment, multi-modal representation apparatus 400 includes memory unit 405, processor unit 410, image encoder 415, text encoder 420, training component 425, momentum image encoder 430, momentum text encoder 435, and search component 440.

Examples of a memory unit 405 include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A processor unit 410 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

According to some embodiments, image encoder 415 encodes the images to produce encoded images. In some examples, the image encoder 415 includes a first image output head and a second image output head, where the at least one image loss term is based on the first image output head and the at least one cross-modal term is based on the second image output head. Image encoder 415 is an example of, or includes aspects of, the corresponding element described with reference to FIGS. 5 and 6.

According to some embodiments, text encoder 420 encodes the captions using a text encoder 420 to produce encoded text. In some examples, the text encoder 420 includes a first text output head and a second text output head, where the at least one text loss term is based on the first text output head and the at least one cross-modal term is based on the second text output head.

According to some embodiments, the image encoder 415 and the text encoder 420 are jointly trained based on a multi-modal loss function including at least one image loss term, at least one text loss term, and at least one cross-modal term. Text encoder 420 is an example of, or includes aspects of, the corresponding element described with reference to FIGS. 5 and 6.

According to some embodiments, training component 425 identifies a training set including a set of images and a set of captions corresponding to the images. In some examples, training component 425 computes a multi-modal loss function based on the encoded images and the encoded text, the multi-modal loss function including at least one image loss term, at least one text loss term, and at least one cross-modal term. In some examples, training component 425 trains the image encoder 415 and the text encoder 420 based on the multi-modal loss function.

In some examples, training component 425 computes an image self-supervised contrastive loss, where the at least one image loss term includes the image self-supervised contrastive loss. In some examples, training component 425 computes a tag-supervised contrastive loss, where the at least one image loss term includes the image tag-supervised contrastive loss.

In some examples, training component 425 computes a caption self-supervised contrastive loss, where the at least one text loss term includes the caption self-supervised contrastive loss. In some examples, training component 425 computes a caption-image contrastive loss, where the at least one cross-modal term includes the caption-image contrastive loss. In some examples, training component 425 computes an image-caption contrastive loss, where the at least one cross-modal term includes the image-caption contrastive loss.

In some examples, the multi-modal loss function is based on a contrastive learning framework such as SimCLR, SimSiam, or BYOL. In some examples, the encoded images and the encoded text are represented in a same embedding space. In some examples, training component 425 adjusts one or more of the images to produce an augmented training set, where the training is based on the augmented training set. In some examples, at least one of the images is represented by multiple captions.

According to some embodiments, momentum image encoder 430 encodes the images using a momentum image encoder 430 to produce momentum encoded images, where the at least one image loss term is based on the encoded images and the momentum encoded images. In some examples, the at least one cross-modal term is based on the momentum encoded images and the encoded text. Momentum image encoder 430 is an example of, or includes aspects of, the corresponding element described with reference to FIG. 6. According to some embodiments, momentum image encoder 430 is parameterized in visual contrastive learning as functions of weights of convolutional neural network (CNN) backbone and 2-layer MLP head.

According to some embodiments, momentum text encoder 435 encodes the captions using a momentum text encoder 435 to produce momentum encoded text, where the at least one text loss term is based on the encoded text and the momentum encoded text. In some examples, the at least one cross-modal term is based on the encoded images and the momentum encoded text. Momentum text encoder 435 is an example of, or includes aspects of, the corresponding element described with reference to FIG. 6.

According to some embodiments, search component 440 performs an image search based on the encoded image and the encoded text. In some examples, the image search includes retrieving search text corresponding to a query image, retrieving a search image corresponding to a query text, or retrieving the search image corresponding to the query image.

FIG. 5 shows an example of a process for visual representation learning according to aspects of the present disclosure. The example shown includes image encoder 500, text encoder 505, image features 510, text features 515, tag supervised contrastive loss 520, image self-supervised contrastive loss 525, text self-supervised contrastive loss 530, image-text contrastive loss 535, and text-image contrastive loss 540.

Image encoder 500 is an example of, or includes aspects of, the corresponding element described with reference to FIGS. 4 and 6. According to some embodiments, image encoder 500 is parameterized in visual contrastive learning as functions of the weights of a convolutional neural network (CNN) backbone, and one or more multi-layer perceptron (MLP) heads.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

An MLP is an ANN consisting of multiple layers such as an input layer, a hidden layer, and an output layer. Accordingly, the present disclosure is not limited to these layers and may include more or less layers.

Text encoder 505 is an example of, or includes aspects of, the corresponding element described with reference to FIGS. 4 and 6. For example, the text encoder may comprise a transformer architecture such as a BERT architecture with one or more MLP heads. A transformer architecture is a neural network that includes multiple attention heads. For example, each attention head can identify different portions of a sentence to use in determining the meaning of a given word in the sentence.

Image features 510 may include a vector representation of the content of an image. Text features 515 may include a vector representation of text (e.g., captions or descriptions of an image).

Tag supervised contrastive loss 520 is based on a distance between a query tag and a positive or negative sample of the tagged words of an encoded image or text. For example, a low tag supervised contrastive loss 520 may indicate that two or more encoded images or text are similar, and a high tag supervised contrastive loss 520 may indicate that two or more encoded images or text are not similar, based on the associated tags.

Image self-supervised contrastive loss 525 is based on a distance between a query image and a positive or negative sample of encoded images. For example, a low image self-supervised contrastive loss 525 indicates that two or more encoded images may be similar, and a high image self-supervised contrastive loss 525 indicates that two or more encoded images are not similar, based on the associated encoded images.

Text self-supervised contrastive loss 530 is based on a distance between a query text and a positive or negative sample of encoded text. For example, a low text self-supervised contrastive loss 530 indicates that two or more encoded texts may be similar, and a high text self-supervised contrastive loss 530 indicates that two or more encoded texts are not similar, based on the associated encoded texts.

Image-text contrastive loss 535 is based on a distance between a query image and a positive or negative sample of encoded text. For example, a low image-text contrastive loss 535 indicates that a query image may be similar to a phrase of text, and a high image-text contrastive loss 535 indicates that an image may be similar to a phrase of text, based on the associated encoded query image and the encoded text.

Text-image contrastive loss 540 is based on a distance between a query text and a positive or negative sample of encoded image. For example, a low image-text contrastive loss 535 indicates that a query text may be similar to an encoded image, and a high image-text contrastive loss 535 indicates that a query text may be similar to an encoded image, based on the associated encoded query text and the encoded image.

FIG. 6 shows an example of a process for multi-modal contrastive training according to aspects of the present disclosure. The example shown includes image encoder 600, momentum image encoder 605, momentum text encoder 610, text encoder 615, and multi-layer perceptron 620. Image encoder 600, momentum image encoder 605, momentum text encoder 610 and text encoder 615 may be examples of, or includes aspects of, the corresponding elements described with reference to FIGS. 4 and 5.

An example architecture for multi-modal contrastive training framework is composed of intra-modal and inter-modal contrastive learning with different types of losses. The intra-modal training scheme is based on contemporary self-supervised representation learning framework (for example, MoCo-v2) to capture intrinsic patterns of augmented image examples. However, some self-supervised methods lack the ability to learn semantic information from higher-level concepts. Therefore, the text encoder 615, momentum image encoder 605, and momentum text encoder 610 are designed to capture semantic information from augmented sentences. Tag information in the contrastive loss may also be used to develop image representations.

The inter-modal training scheme is designed to enhance image features by embracing the cross-modal interactions. Image and text features are embedded into a common space and image-semantic contrastive losses are designed to force the features of semantically similar input examples to be closer. Image features are adjusted according to captions via back propagation, and vice versa.

In the example of FIG. 6, distinct multi-layer perceptron 620 layers are used for cross-modal feature embedding to avoid interference of two intramodality and inter-modality training schemes. Text features are generated, and generic image representations are learned through combinations of the two training schemes. After the completion of multi-modal contrastive training, the image encoder 600 can be directly applied to or fine-tuned for various downstream tasks.

Training

Embodiments of the present disclosure learn image representation from multi-modal data in a unified training framework. The framework design uses data potential within each unlabeled modality in a self-supervised manner by comparing different modalities in a common semantic space with similarity preservation objectives while bridging the heterogeneity gap. The design may also be extended to other modalities. High-quality image features are learned by cross-modal correlation modeling and intrinsic data properties provided by the modalities.

In some examples, an intra-modal training path is used to capture the intrinsic patterns of augmented data examples in a prediction task. An inter-modal training scheme is used to enhance the image features by embracing the cross-modal interactions. With carefully designed contrastive losses, features in multiple modalities are adjusted using backpropagation in multiple training paths.

The multi-modal training framework exploits intrinsic data properties within each modality and simultaneously extracts semantic information from cross-modal correlation. In addition, the representation learning framework may be symmetric for multiple modalities, suggesting flexibility to incorporate any new modality.

Self-supervised methods utilize contrastive objectives, for instance, comparison to facilitate image representation learning. For example, use of a memory bank which stores pre-computed representations and the noise-contrastive estimation (NCE) for a large number of instance classes. Storing representations from momentum encoders in a dynamic dictionary with a queue enhances the scheme. A simple framework under the large-batch setting, which does not use memory representations, is suggested in the present disclosure. In one embodiment, an MLP head design shows significant improvements over conventional architectures. Embodiments of the present disclosure use contrastive image representation learning. However, multi-modal data in multiple training paths is used to increase alignment of the image features with additional semantic information.

Accordingly, a method, apparatus, non-transitory computer readable medium, and system for visual representation learning are described. One or more embodiments of the method, apparatus, non-transitory computer readable medium, and system include identifying a training set including a plurality of images and a plurality of captions corresponding to the images, encoding the images using an image encoder to produce encoded images, encoding the captions using a text encoder to produce encoded text, computing a multi-modal loss function based on the encoded images and the encoded text, the multi-modal loss function including at least one image loss term, at least one text loss term, and at least one cross-modal term, and training the image encoder and the text encoder based on the multi-modal loss function.

Some examples of the method, apparatus, non-transitory computer readable medium, and system described above further include computing an image self-supervised contrastive loss, wherein the at least one image loss term includes the image self-supervised contrastive loss. Some examples of the method, apparatus, non-transitory computer readable medium, and system described above further include computing a tag-supervised contrastive loss, wherein the at least one image loss term includes the image tag-supervised contrastive loss.

Some examples of the method, apparatus, non-transitory computer readable medium, and system described above further include computing a caption self-supervised contrastive loss, wherein the at least one text loss term includes the caption self-supervised contrastive loss. Some examples of the method, apparatus, non-transitory computer readable medium, and system described above further include computing a caption-image contrastive loss, wherein the at least one cross-modal term includes the caption-image contrastive loss. Some examples of the method, apparatus, non-transitory computer readable medium, and system described above further include computing an image-caption contrastive loss, wherein the at least one cross-modal term includes the image-caption contrastive loss.

Some examples of the method, apparatus, non-transitory computer readable medium, and system described above further include encoding the images using a momentum image encoder to produce momentum encoded images, wherein the at least one image loss term is based on the encoded images and the momentum encoded images. In some examples, the at least one cross-modal term is based on the momentum encoded images and the encoded text. Some examples of the method, apparatus, non-transitory computer readable medium, and system described above further include encoding the captions using a momentum text encoder to produce momentum encoded text, wherein the at least one text loss term is based on the encoded text and the momentum encoded text.

In some examples, the at least one cross-modal term is based on the encoded images and the momentum encoded text. In some examples, the multi-modal loss function is based on a contrastive learning framework comprising one of SimCLR, SimSiam, or BYOL. In some examples, the encoded images and the encoded text are represented in a same embedding space.

Some examples of the method, apparatus, non-transitory computer readable medium, and system described above further include adjusting one or more of the images to produce an augmented training set, wherein the training is based on the augmented training set. In some examples, at least one of the images corresponds to multiple captions.

A multi-modal dataset comprising N image-caption-tags tuples may be denoted as $D=\{(I_j, c_j, t_j)\}$. Here, $t_j$ is a K-dim binary vector where $t_j^{(k)}$ is an indicator of the occurrence of a specific k-th tag in $I_j$. Intra-modality contrastive training preserves the similarity within augmented variants of the same image or caption through self-supervised learning. For example, intra-modal image/textual contrastive learning based on the MoCo-v2 framework is formulated.

Image encoders $f_{iq}(.; \theta_q; \phi_{iq})$ and momentum image encoders $f_{ik}(.; \theta_k; \phi_{ik})$ are parameterized in image contrastive learning as functions of weights $(\theta, \phi)$ of convolutional neural network (CNN) backbone and 2-layer MLP head. The weights $(\theta_k, \phi_{ik})$ are updated using momentum coefficient m: $\theta_k \leftarrow m\theta_k+(1-m)\theta_q$, $\phi_{ik} \leftarrow m\phi_{ik}+(1-m)\phi_{iq}$. The notation differs from contemporary self-supervised representation learning frameworks (i.e., MoCo-v2) where encoder weights are taken as a whole. Backbone features are mapped into different spaces, decoupling the feature embeddings from intra-modal and intermodal training paths. Image encoders and momentum encoders embed augmented examples $I_j^\dagger$, $I_j^\dagger$ from the same input image $I_j$ in a minibatch, to query and key features:

$$q_{ii}^j = f_{iq}(I_j^\dagger; \theta_q, \phi_{iq}) \quad (1)$$

$$k_{ii}^j = f_{ik}(I_j^*; \theta_k, \phi_{ik}) \quad (2)$$

Figure 7:
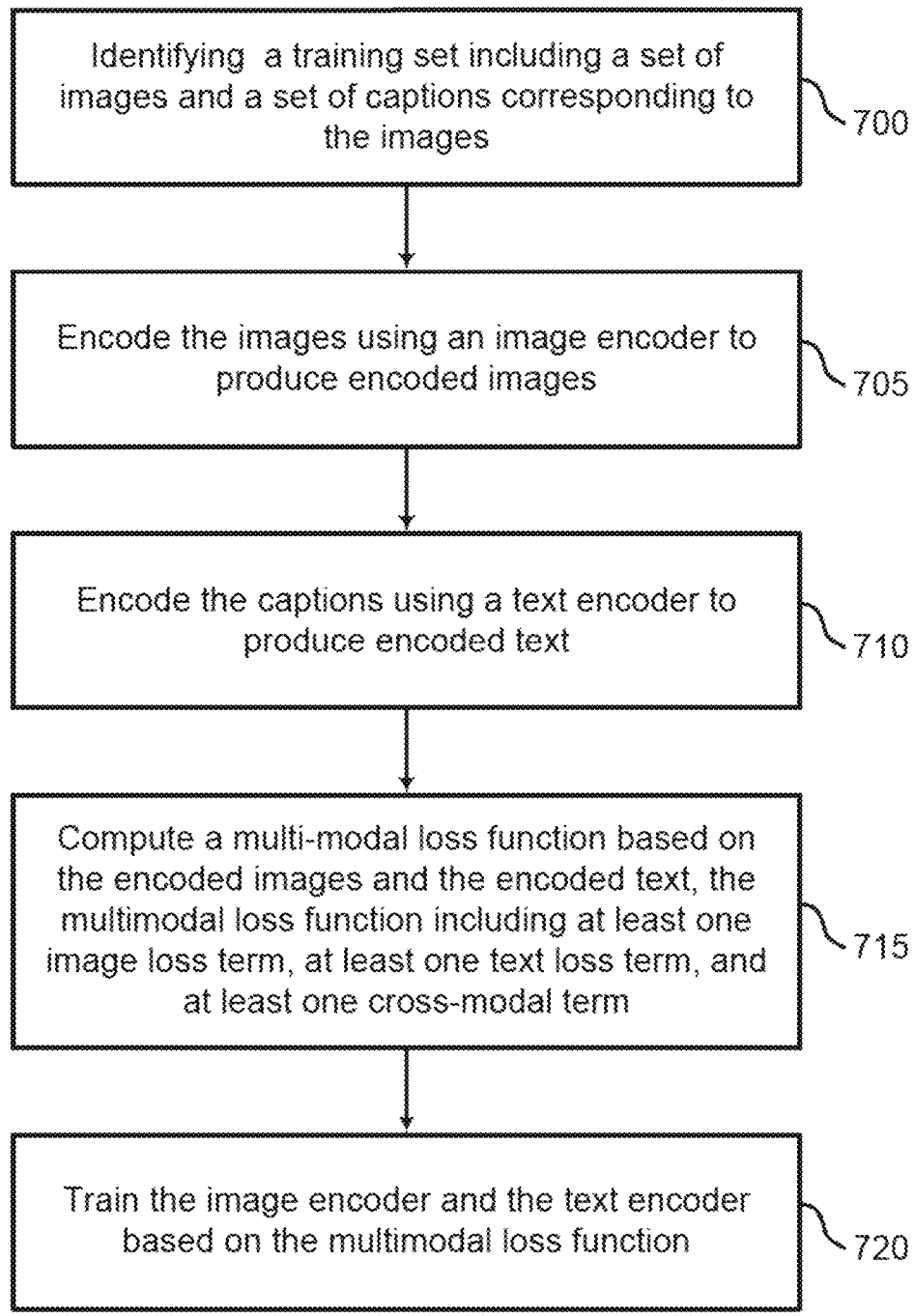
FIG. 7 shows an example of a process for training according to aspects of the present disclosure.

FIG. 7 shows an example of a process for training according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system identifies a training set including a set of images and a set of captions corresponding to the images. In some cases, the operations of this step refer to, or may be performed by, a training component as described with reference to FIG. 4.

At operation 705, the system encodes the images using an image encoder to produce encoded images. In some cases, the operations of this step refer to, or may be performed by, an image encoder as described with reference to FIGS. 4-6.

At operation 710, the system encodes the captions using a text encoder to produce encoded text. In some cases, the operations of this step refer to, or may be performed by, a text encoder as described with reference to FIGS. 4-6.

At operation 715, the system computes a multi-modal loss function based on the encoded images and the encoded text, the multi-modal loss function including at least one image loss term, at least one text loss term, and at least one cross-modal term. In some cases, the operations of this step refer to, or may be performed by, a training component as described with reference to FIG. 4.

At operation 720, the system trains the image encoder and the text encoder based on the multi-modal loss function. In some cases, the operations of this step refer to, or may be performed by, a training component as described with reference to FIG. 4.

Figure 8:
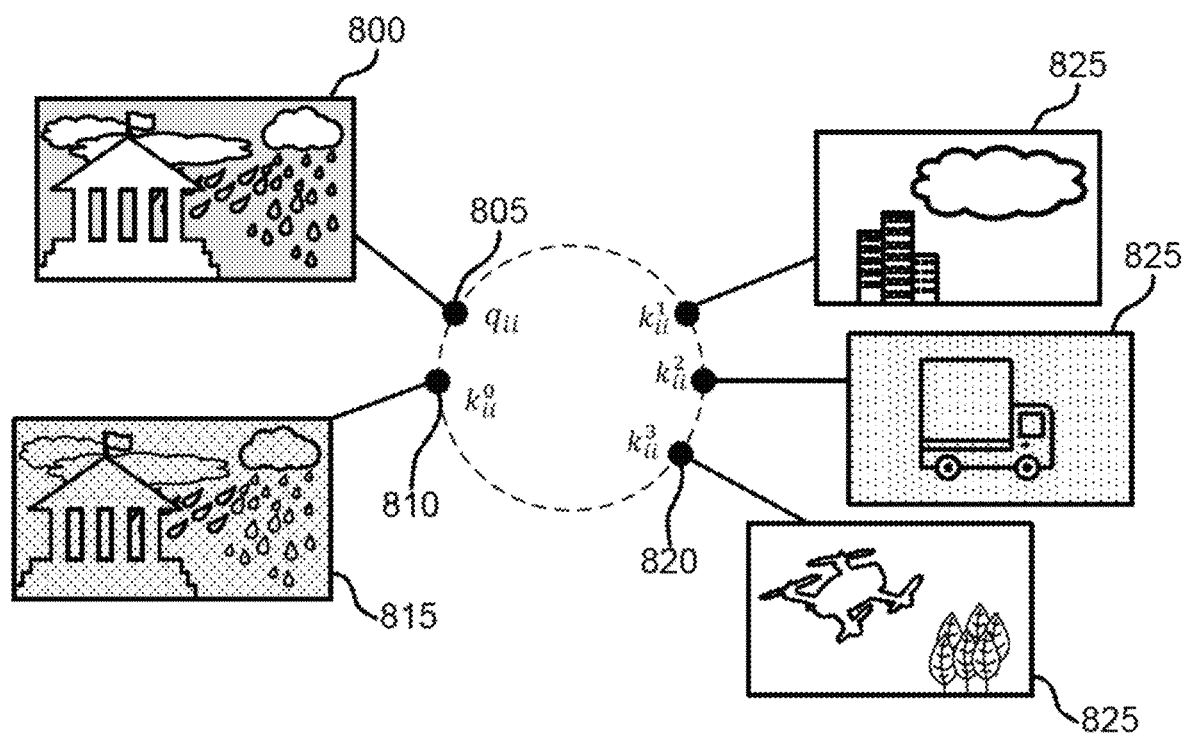
FIG. 8 shows an example of an image self-supervised contrastive loss diagram according to aspects of the present disclosure.

FIG. 8 shows an example of an image self-supervised contrastive loss diagram according to aspects of the present disclosure. The image self-supervised contrastive loss may be an example of an image loss term. The example shown includes query image 800, query feature 805, key feature 810, positive sample 815, negative key 820, and negative sample 825.

A dynamic set of key features (for example, length) is maintained by iterative dequeue and enqueue operations. For example, a query feature 805 ($q_{ii}$) in a mini batch and key feature 810 ($k_{it}$) in the queue denoted as $k_{ii}^+$ is considered to originate from the same image if a positive pair forms between the query feature 805 and the key feature 810. The image self-supervised contrastive loss is defined as:

$$J_{ii} = -\log \exp(q_{ii} \cdot k_{rr}^+/\tau)/\Sigma_{j=0}^k \exp(q_{ii} \cdot k_{ii}^j/\tau) \tag{3}$$

where · denotes dot product computing similarity scores between example pairs and $\tau$ is a temperature hyperparameter.

A positive sample 815 may be determined based on having a smaller image self-supervised contrastive loss compared to the negative sample 825. For example, a negative sample 825 may be determined to have a larger image self-supervised contrastive loss from the query feature 805 to the negative key 820.

Figure 9:
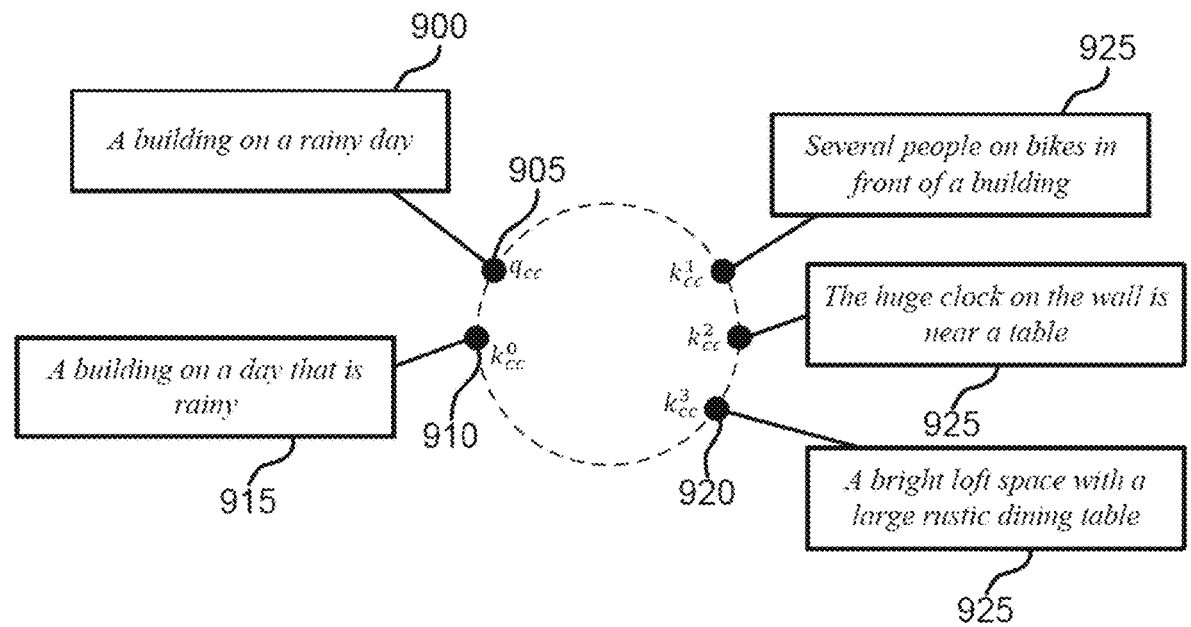
FIG. 9 shows an example of a text self-supervised contrastive loss diagram according to aspects of the present disclosure.

FIG. 9 shows an example of a text self-supervised contrastive loss diagram according to aspects of the present disclosure. The text self-supervised contrastive loss may be an example of a text loss term. The example shown includes query text 900, query feature 905, key feature 910, positive sample 915, negative key 920, and negative sample 925.

Textual encoders and momentum encoders are designed to extract features from augmented captions in textual contrastive learning to obtain useful semantic information from higher-level concepts. For example, BERT is used as a textual encoder architecture with a 2-layer MLP head. Textual encoders $f_{cg}(.; \Theta_q; \Phi_{cq})$ and momentum textual encoders $f_{ck}(.; \Theta_k; \Phi_{ik})$ are parametrized as functions of the weights $\Phi, \Theta$ of BERT and 2-layer MLP head. Backtranslation is used for caption data augmentation. The same notion of key, query and queue is maintained in textual contrastive training scheme and image contrastive learning. Textural encoders and momentum encoders embed different augmented examples $c_j^+$, $c_j^*$ from the same input caption source in a minibatch to query feature 905 and key feature 910. The query text 900 may be associated with a query feature 905. The embedding and mapping of caption modality is formulated as:

$$q_{cc}^j = f_{cq}(c_j^+; \theta_q, \Phi_{cq}) \tag{4}$$

$$k_{cc}^j = f_{ck}(c_j^*; \theta_k, \Phi_{ck}) \tag{5}$$

The key feature 910 $k_{cc}^+$ is predicted from the queue which originates from the same input source with $q_{cc}$. The contrastive loss is defined as:

$$J_{cc} = -\log \frac{\exp(q_{cc} \cdot k_{cc}^+/\tau)}{\sum_{j=0}^{K} \exp(q_{cc} \cdot k_{cc}^j/\tau)} \tag{6}$$

where the dot product denotes similarity score and $\tau$ is a temperature parameter.

Semantic information from captions is utilized for higher image feature learning by enabling cross-modal interactions using inter-modality contrastive training schemes. Image and caption representations are embedded into a common space followed by ranking-based contrastive loss to learn image and textual model parameters. For example, a CNN and a BERT are used as representation model backbones with distinct branches of MLP layers and larger output dimensions. Distinct MLPs design degrades the downstream task performance while using unified or separate MLPs with same-sized embedding space.

Objective functions encourage similarities of ground-truth caption-image pairs to be greater than negative pairs instead of solving a hard prediction task as in intra-modal cases. A positive sample 915 may be determined based on having a smaller image self-supervised contrastive loss compared to the negative sample 925. For example, a negative sample 925 may be determined to have a larger image self-supervised contrastive loss from the query feature 905 to the negative key 920.

Figure 10:
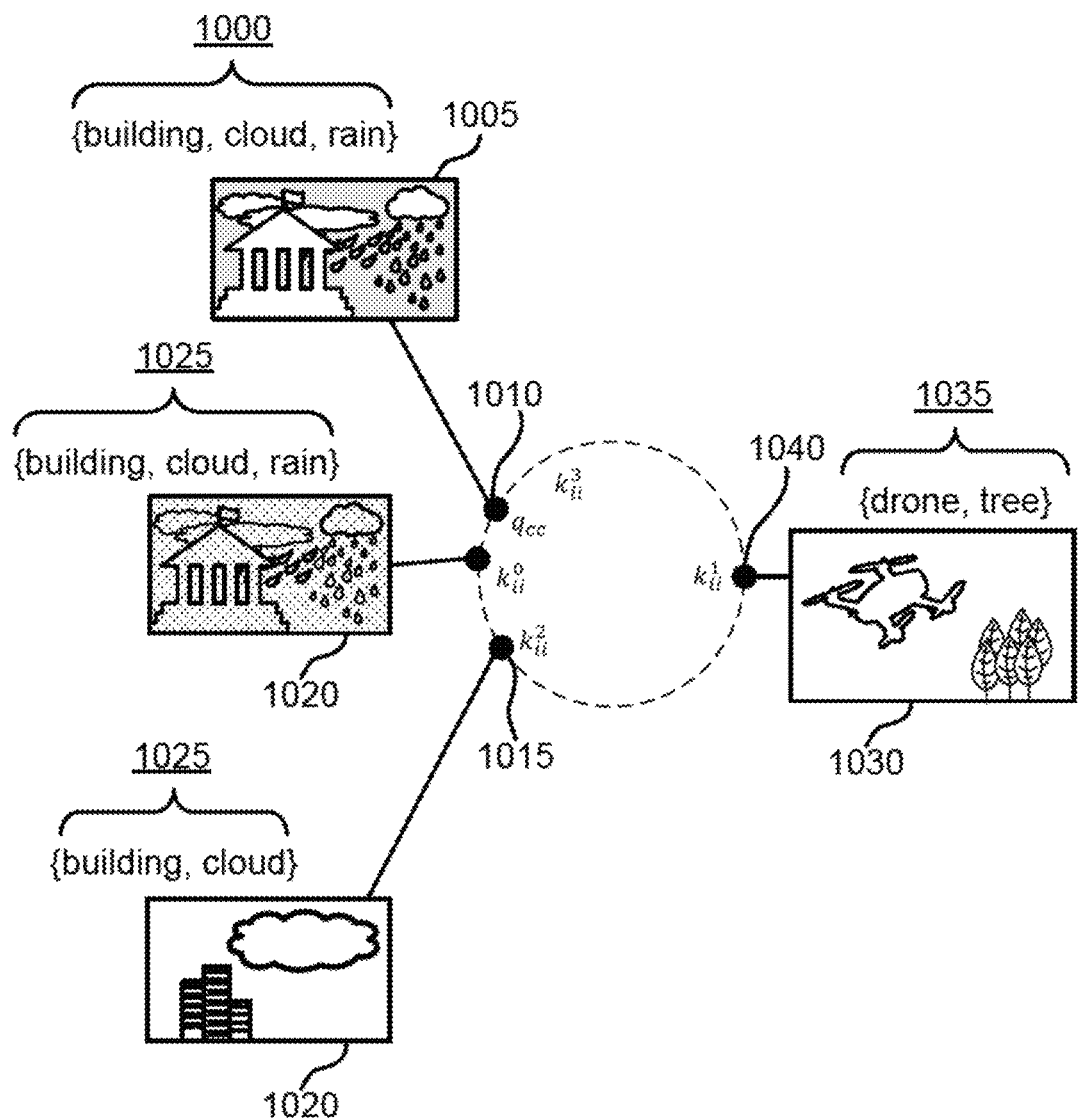
FIG. 10 shows an example of a tag supervised contrastive loss diagram according to aspects of the present disclosure.

FIG. 10 shows an example of a tag supervised contrastive loss diagram according to aspects of the present disclosure. The tag supervised contrastive loss may be an example of an image loss term. The example shown includes input tag 1000, query feature 1010, positive key 1015, positive sample 1020, positive tag 1025, negative sample 1030, and negative tag 1035, and negative key 1040.

Self-supervised learning frameworks consider augmented examples originating from other images as negative samples, even if a query image 1005 and sample image share very similar semantic concepts (i.e., with overlapping tags). The query image 1005 may be associated with a query feature 1010. An additional loss term in the image-contrastive training path using input tag 1000 provided by a dataset is designed to encourage closer semantic-aligned image representation learnings. In addition to samples originating from the same input source, images sharing some common tags are considered positive. Formally, the key set is extended to:

$$P = \{k_{ii}^p | \forall p: t_p \cdot t_j > \epsilon\} \tag{7}$$

where the dot product computes the similarity score between two input tag 1000 lists and $\epsilon$ is a threshold hyperparameter.

Thus, the tag supervised loss term is defined as:

$$J_{tag} = -\frac{1}{|P|}\sum_{p \in P} \log \frac{\exp(q_{ii} \cdot k_{ii}^p / \tau)}{\sum_{j=0}^{K} \exp(q_{ii} \cdot k_{ii}^j / \tau)} \quad (8)$$

where |P| denotes the set size of P. $J_{tag}$ degenerates to $J_{ii}$ when there are no samples in queue sharing common semantics with query sample, i.e., $P=\{k_{ii}^+\}$, |P|=1.

A positive sample 1020 may be determined based on having a smaller image self-supervised contrastive loss compared to the negative sample 1030. For example, a negative sample 1030 may be determined to have a larger image self-supervised contrastive loss from the query feature 1010 to the negative key 1040. In the case of FIG. 10, there are more than one positive sample 1020. Additionally, a same input tag 1000 may be associated with a query image 1005 and a positive sample 1020.

Figure 11:
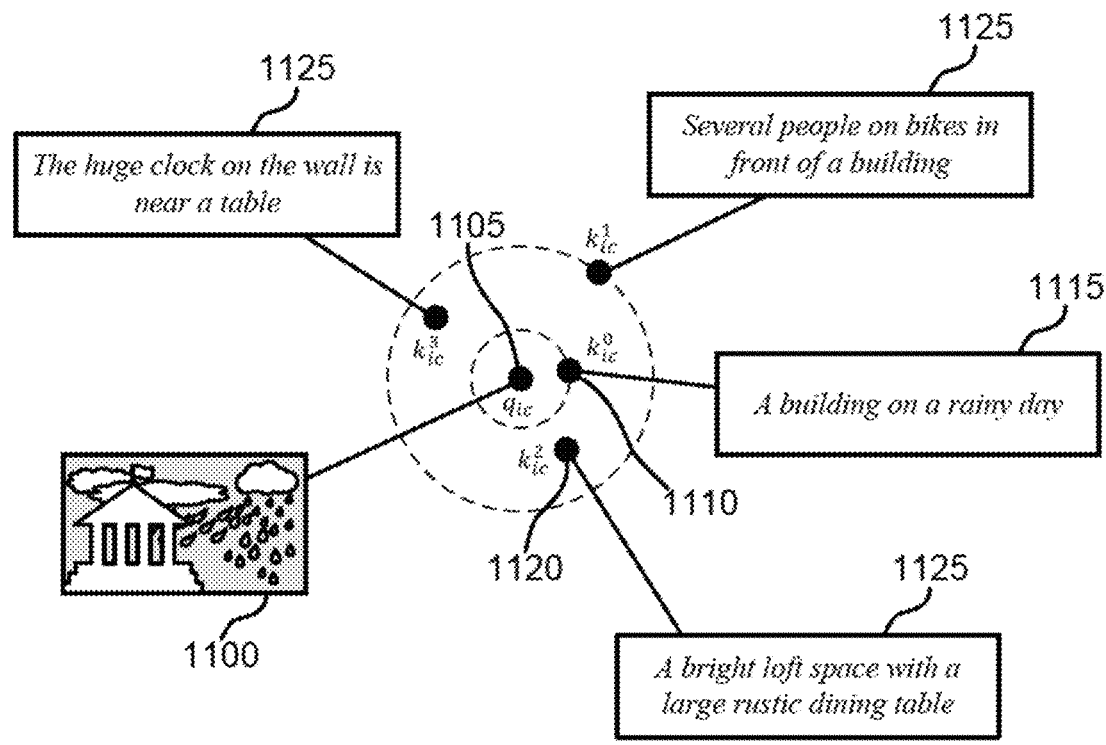
FIG. 11 shows an example of an image-text contrastive loss diagram according to aspects of the present disclosure.

FIG. 11 shows an example of an image-text contrastive loss diagram according to aspects of the present disclosure. The image-text contrastive loss may be an example of a cross-modal loss term. The example shown includes query image 1100, query feature 1105, key feature 1110, positive sample 1115, negative key 1120, and negative sample 1125.

For a given image-caption pair $I_j$, $c_j$, the query feature is generated in image-text contrastive learning using image encoders and key features using momentum textual encoders and mapped to the common space:

$$q_{ic}^j = f_{iq}(I_j^\dagger; \theta_q, \phi_{cq}) \quad (9)$$

$$k_{ic}^j = f_{ck}(c_j^*; \Theta_k, \Phi_{ik}) \quad (10)$$

where $\phi_{cq}$, $\Phi_{ik}$ denote distinct MLP layers parameters from $\phi_{iq}$, $\Phi_{ck}$. The key feature 1110 from the queue is denoted as $k_{ic}^+$ which originates from the positive image-text pair with $q_{ic}$, i.e., image described by the caption. The aim is to simultaneously minimize the distance between query feature 1105 described by the text and the key feature 1110, and maximize the distances between query feature 1105 described by the text and other negative keys 1120 from the queue.

The image-text contrastive loss is formulated as:

$$J_{ic} = \sum_{j=1}^{K} [\alpha - q_{ic} \cdot k_{ic}^+ + q_{ic} \cdot k_{ic}^j]_+ \quad (11)$$

where $\alpha$ is the margin, the dot product denotes similarity score, and $[x]_+$ represents max(x; 0).

A positive sample 1115 may be determined based on having a smaller image self-supervised contrastive loss compared to the negative sample 1125. For example, a negative sample 1125 may be determined to have a larger image self-supervised contrastive loss from the query feature 1105 to the negative key 1120. In the case of FIG. 10, there are more than one positive sample 1115.

Figure 12:
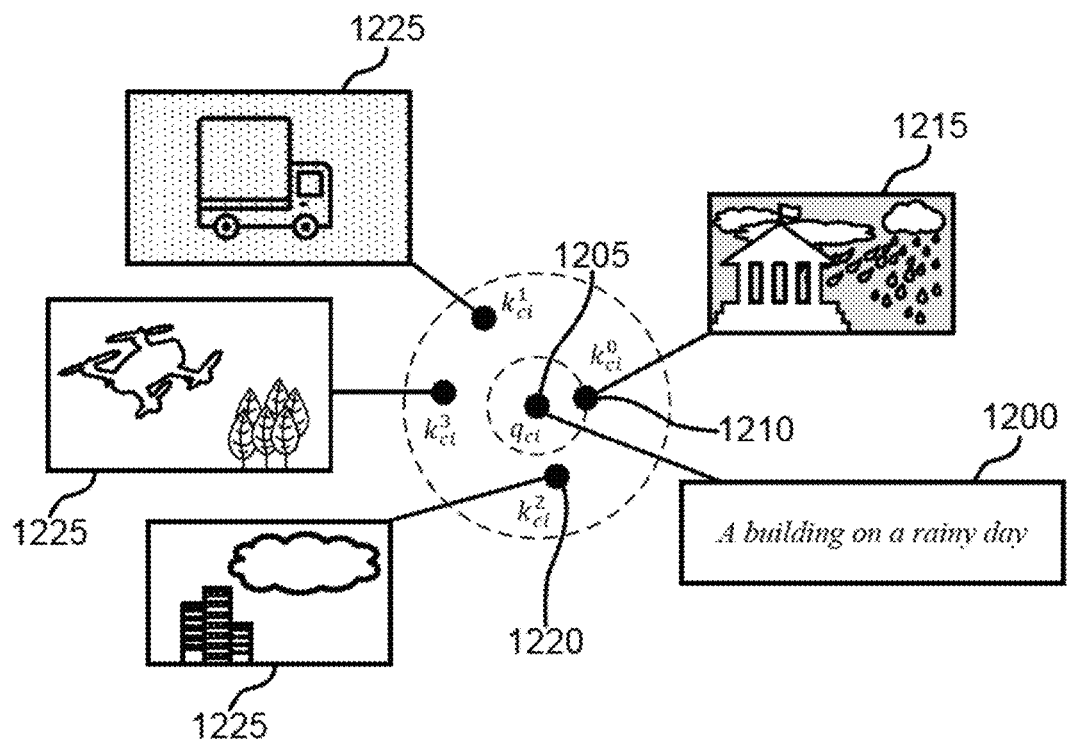
FIG. 12 shows an example of a text-image contrastive loss diagram according to aspects of the present disclosure.

FIG. 12 shows an example of a text-image contrastive loss diagram according to aspects of the present disclosure. The text-image contrastive loss may be an example of a cross-modal loss term. The example shown includes query text 1200, query feature 1205, key feature 1210, positive sample 1215, negative key 1220, and negative sample 1225.

The query feature using textual encoder and key feature using the momentum image encoder is generated in text-image contrastive learning as:

$$q_{ci}^j = f_{cq}(c_j^\dagger; \Theta_q, \Phi_{iq}) \quad (12)$$

$$k_{ci}^j = f_{ik}(I_j^*; \theta_k, \phi_{ck}) \quad (13)$$

where $\Phi_{iq}$, $\phi_{ck}$ denote distinct MLP layers parameters from $\Phi_{cq}$, $\phi_{ik}$.

The caption-to-image contrastive loss aims at optimizing distance between caption query and image queue and is defined as:

$$J_{ic} = \sum_{j=1}^{K} [\alpha - q_{ic} \cdot k_{ic}^+ + q_{ic} \cdot k_{ic}^j]_+ \quad (14)$$

in which $\alpha$ is the margin, the dot product is similarity score, and $[x]_+$ represents max(x; 0).

A positive sample 1215 may be determined based on having a smaller image self-supervised contrastive loss compared to the negative sample 1215. For example, a negative sample 1215 may be determined to have a larger image self-supervised contrastive loss from the query feature 1205 to the negative key 1220. In the case of FIG. 10, there are more than one positive sample 1215.

Thus, according to an example embodiment, a final loss for multi-modal contrastive training method is formulated as:

$$J = \lambda_{ii}J_{ii} + \lambda_{tag}J_{tag} + \lambda_{cc}J_{cc} + \lambda_{ic}J_{ic} + \lambda_{ci}J_{ic} \quad (15)$$

where $\lambda_{ii}$, $\lambda_{tag}$, $\lambda_{cc}$, $\lambda_{ic}$ and $\lambda_{ci}$ are trade-off parameters among different contrastive losses.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

Embodiments of the present disclosure provide a method is to learn image representations in a unified multi-modal training framework, composed of intra-modal and inter-modal learning paths with carefully designed contrastive losses. High-quality image features are learned with increased scalability and transferability. The developed framework is symmetric for multiple modalities (e.g., images and captions explored here), and is therefore flexible to be extended to other modalities such as videos and audios.

The invention claimed is:

1. A method of training a machine learning model, the method comprising:
identifying a training set comprising a plurality of images and a plurality of captions corresponding to the images;
encoding the images using an image encoder to produce encoded images;
encoding the captions using a text encoder to produce encoded text;
computing a multi-modal loss function based on the encoded images and the encoded text, the multi-modal loss function comprising at least one image loss term, at least one text loss term, and at least one cross-modal term; and
training the image encoder and the text encoder based on the multi-modal loss function.

2. The method of claim 1, further comprising:
computing an image self-supervised contrastive loss, wherein the at least one image loss term includes the image self-supervised contrastive loss.

3. The method of claim 1, further comprising:
computing a tag-supervised contrastive loss, wherein the at least one image loss term includes the image tag-supervised contrastive loss.

4. The method of claim 1, further comprising:
computing a caption self-supervised contrastive loss, wherein the at least one text loss term includes the caption self-supervised contrastive loss.

5. The method of claim 1, further comprising:
computing a caption-image contrastive loss, wherein the at least one cross-modal term includes the caption-image contrastive loss.

6. The method of claim 1, further comprising:
computing an image-caption contrastive loss, wherein the at least one cross-modal term includes the image-caption contrastive loss.

7. The method of claim 1, further comprising:
encoding the images using a momentum image encoder to produce momentum encoded images, wherein the at least one image loss term is based on the encoded images and the momentum encoded images.

8. The method of claim 7, wherein:
the at least one cross-modal term is based on the momentum encoded images and the encoded text.

9. The method of claim 1, further comprising:
encoding the captions using a momentum text encoder to produce momentum encoded text, wherein the at least one text loss term is based on the encoded text and the momentum encoded text.

10. The method of claim 9, wherein:
the at least one cross-modal term is based on the encoded images and the momentum encoded text.

11. The method of claim 1, wherein:
the multi-modal loss function is based on a contrastive learning framework.

12. The method of claim 1, wherein:
the encoded images and the encoded text are represented in a same embedding space.

13. The method of claim 1, further comprising:
adjusting one or more of the images to produce an augmented training set, wherein the training is based on the augmented training set.

14. An apparatus comprising:
an image encoder configured to encode images to produce encoded images;
a text encoder configured to encode captions corresponding to the images to produce encoded text; and
a training component configured to compute a multi-modal loss function based on the encoded images and the encoded text and to train the image encoder and the text encoder based on the multi-modal loss function, wherein the multi-modal loss function comprises at least one image loss term, at least one text loss term, and at least one cross-modal term.

15. The apparatus of claim 14, further comprising:
a momentum image encoder configured to encode the images to produce momentum encoded images, wherein the at least one image loss term is based on the encoded images and the momentum encoded images.

16. The apparatus of claim 14, further comprising:
a momentum text encoder configured to encode the captions to produce momentum encoded text, wherein the at least one text loss term is based on the encode text and the momentum encoded text.

17. The apparatus of claim 14, wherein:
the image encoder comprises a first image output head and a second image output head, wherein the at least one image loss term is based on the first image output head and the at least one cross-modal term is based on the second image output head.

18. The apparatus of claim 14, wherein:
the text encoder comprises a first text output head and a second text output head, wherein the at least one text loss term is based on the first text output head and the at least one cross-modal term is based on the second text output head.

19. A method of image search comprising:
encoding an image using an image encoder to produce an encoded image;
encoding text using a text encoder to produce encoded text, wherein the image encoder and the text encoder are jointly trained based on a multi-modal loss function comprising at least one image loss term, at least one text loss term, and at least one cross-modal term; and
performing an image search based on the encoded image and the encoded text.

20. The method of claim 19, wherein: the image search comprises retrieving search text corresponding to a query image, retrieving a search image corresponding to a query text, or retrieving the search image corresponding to the query image.

\* \* \* \* \*